United States Patent [19]

Eckberg et al.

[11] Patent Number: 5,726,834
[45] Date of Patent: Mar. 10, 1998

[54] ACTUATOR FOR SERVO ACTUATED TAPE DRIVE

[75] Inventors: Eric Alan Eckberg; Gerald Daniel Malagrino, Jr., both of Rochester; Brian Lee Rappel, Grand Meadow, all of Minn.

[73] Assignee: International Business Machines Corporation, Armonk, N.Y.

[21] Appl. No.: 489,462

[22] Filed: Jun. 7, 1995

[51] Int. Cl.$^6$ ............................. G11B 5/584; G11B 5/55; G11B 21/02
[52] U.S. Cl. .................. 360/106; 360/78.02; 360/109
[58] Field of Search ................... 360/106, 109, 360/77.12, 78.02

[56] References Cited

U.S. PATENT DOCUMENTS

| | | | |
|---|---|---|---|
| 4,363,046 | 12/1982 | Saito | 360/106 |
| 4,646,183 | 2/1987 | Cohen | 360/106 |
| 4,858,047 | 8/1989 | Cannon et al. | 360/106 |
| 4,943,877 | 7/1990 | Cannon et al. | 360/106 |
| 5,047,883 | 9/1991 | Aldrich et al. | 360/109 |
| 5,091,808 | 2/1992 | Nigam | 360/78.05 |
| 5,191,492 | 3/1993 | Nayak et al. | 360/78.02 |
| 5,270,886 | 12/1993 | Nigam | 360/78.05 |
| 5,280,402 | 1/1994 | Anderson et al. | 360/106 |
| 5,331,490 | 7/1994 | Richards et al. | 360/109 |
| 5,371,636 | 12/1994 | Nayak et al. | 360/75 |
| 5,377,052 | 12/1994 | Guzman et al. | 360/106 |
| 5,379,170 | 1/1995 | Schwarz | 360/109 |
| 5,414,578 | 5/1995 | Lian et al. | 360/106 |
| 5,434,732 | 7/1995 | Schwarz et al. | 360/109 |
| 5,450,257 | 9/1995 | Tran et al. | 360/76 |

OTHER PUBLICATIONS

Publications QIC Development Standard, QIC-139, rev. G, 31 Aug. 1994.

*Primary Examiner*—Stuart S. Levy
*Assistant Examiner*—William J. Klimowicz
*Attorney, Agent, or Firm*—Laurence R. Letson

[57] ABSTRACT

An actuator for coarse and fine positioning of a read/write head incorporates at least one pivoted member to position the read/write head relative to storage tape that stores the data. The pivoted member may be a beam supporting a read/write head or link of a four bar linkage and is typically pivoted on a carriage. The pivoted motion and the associated motion of the read/write head must not introduce excessive zenith tilt or the recording/writing of data will be unreliable.

7 Claims, 8 Drawing Sheets

ACTUATOR FOR SERVO ACTUATED TAPE DRIVE

RELATED PATENT APPLICATIONS

This application is related to U.S. patent application Ser. No. 08/474,227 filed on even date herewith, titled: Hybrid Actuator Servo Actuated Tape Drive, by Eric. A. Eckberg et al.; U.S. patent application Ser. No. 08/472,829 filed on even date herewith, titled: Lockout Feature For Servo Actuated Tape Drives, by Eric. A. Eckberg et al.; and U.S. Pat. No. 5,659,441 filed on even date herewith, titled: Mechanical Drive Enclosure For High Performance Tape Drive, by Eric. A. Eckberg et al.

FIELD OF THE INVENTION

This invention relates to tape drives for data recording and specifically to the recording of very high density data on magnetic tape in a reliable manner so that the data may be retrieved with a high degree of accuracy.

BACKGROUND OF THE INVENTION

Data storage on magnetic tape is well known and tape recorders have been used to record data tracks on magnetic tape. However, the previous technique to record data in a plurality of parallel data tracks on the magnetic tape was to position the head relative to the tape path by moving the read/write head relative to the tape to different track positions as desired and then holding the read/write head stationary. In such a system, the tape tracks must both be sufficiently wide and separated to guarantee that the exposure of the data track to the head is accurate at least to the minimum requirements necessary to reliably read and write the data. The read/write head is positioned at a predetermined fixed point, relative to the magnetic tape path and the data track must accommodate variations of recording track location and tape location variances as the tape feeds past the head. Historically, this accommodation has been accomplished insuring that the track width and the data track separation on the magnetic tape are sufficient for the read/write head to remain positioned over the designated track and at the same time not read magnetically recorded signals from an adjacent track. This arrangement of track width and track separation will accommodate any deviation of the track location from the design norm either due to being recorded on a first recorder and played or rerecorded on a second recorder or due to the wander of the tape as it is spooled past the read/write head from one spool to the other spool of a cartridge.

The definition of the magnetic read/write head and the track width and separations effectively limits the number of data tracks that may be recorded on any given width of tape. Reliance solely on the track width and track separations to insure reliable read/write operations results in a significant waste of magnetic tape surface and thus limits the data density on the tape.

Whenever the positional requirements of the system are satisfied, the resulting track width and spacing clearly limit the number of data tracks. Data may be recorded in tracks that are much narrower and still be reliable from a read/write standpoint, but the read/write head must be and remain perfectly aligned with the data track. However, as the track width and the read/write head width narrow in an effort to increase the data capacity of a given tape area, any misalignment of the head with the track may lead to read/write repeatability failures and lost data. Thus, the resolution of the head placement mechanism and the precision of the placement of the tape relative to the read/write head become limiting factors affecting the recording density of data on the magnetic tape surface in tape drives having static read/write heads.

In order to overcome the limitation in data density described above, the alignment of the magnetic tape data recording track relative to the read/write head gap of the read/write head must be greatly improved or controlled. Since it is not as practical to attempt to control the tape path and the data track position based on tape position, the choice devolves to controlling the read/write head more precisely and on a responsive basis.

Efforts to control the head of a tape drive on a real-time basis to maintain the head/data track alignment use a servo control to finely position the head relative to the coarse positioning of the stepper motor drive that drives the head carriage to a detented or static position.

In order to position the head precisely relative to a moving data track on tape, a servo read/write head positioning drive is incorporated into the tape drive system. The servo drive parameters of a high density tape cartridge are set forth in a QIC development standard, QIC-139, Rev. G., 31 Aug. 1994, published by Quarter-Inch Cartridge Drive Standards, Inc., 311 East Carrillo St., Santa Barbara, Calif. 93101. Among other criteria this standard defines a pattern of servo tracks and data tracks that must be adhered to insure compatibility of the cartridges recorded on one recorder and read on another recorder. To provide the locational control of the servo read/write head positioning drive, a magnetic read head gap may be placed at a position relative to a servo track on the tape. Then the read head gap is further moved to detect the edge of the servo control track (servo track) recorded on the tape. The read head will provide signals which may be used to indicate the head location relative to the servo track. By using these signals as a basis, the servo control then may produce a positioning signal to drive a servo positioner. The servo positioner moves the read head, causing the read head to track or follow the edge of the servo control track which has been previously recorded on the tape.

Thus as the servo control track deviates from perfect positioning relative to the read head (servo tracking head), the servo control will activate and move the servo tracking head to follow the servo track. The mass of the apparatus used for servo tracking should be as small as possible in order to be responsive and to facilitate very precise placement of the servo tracking head.

The head assembly which incorporates the servo tracking head also has at least one read/write head spaced a precise, predetermined distance from the servo tracking head. Thus, whenever the servo tracking head is moved to follow the servo track, the data heads will be moved a like amount. The relative placement of the data tracks with respect to the servo track is constant, making tracking of the data tracks possible and reliable. Because the tracks, data and servo, are longitudinal to the tape, the tracking motion of the head assembly is perpendicular to the movement of the tape. Movement will be very small in the tracking direction.

Movement in the coarse mode will be in the same direction, perpendicular to tape movement, but in coarse steps that are defined by a stepper motor and an associated mechanical drive.

Additionally, due to the large amount of data that users may have already recorded on tapes using tape drives that do not have servo tracking capability, it is desirable to accommodate the previously recorded data cartridges. Without backward compatibility, a user will be less motivated to migrate to a servo controlled system.

In order to accommodate the older non-servo tracking data cartridges, the servo tracking cartridges must have an identifier so the tape drive can recognize the cartridges and their associated formats.

The tape drive also must have the cartridge recognition capabilities, and the capabilities to disable the servo system and permit the operation of the tape drive in an open-loop mode.

The read/write head of the drive must be accurately and reliably positioned over the data track of the older non-servo compatible cartridges. There being no servo track recorded on the earlier level tapes, the servo mechanism must not function when reading or writing an earlier level data cartridge. The head assembly cannot be allowed to fluctuate, which may be a possibility, whenever not under active servo control. If fluctuations occur, the recorded data tracks on the tape will not be accurately followed by the read/write head; the data may not be reliably read or may not be recorded in such a manner to be reliably read at a later time either with the same tape drive or with another tape drive since the fluctuations of the read/write head cannot be reliably repeated.

The QIC Standard is exemplary of the cartridge and data/servo track recording format which has been published. The servo tracks are grouped in two bands that extend over the recording length of the tape. The QIC Standard is but one of several possible arrangements and only serves to promote compatibility of data cartridges and the tape drives with which they are used.

OBJECTS OF THE INVENTION

It is an object of the invention to provide a servo control head tracking assembly for the writing and reading of data on a magnetic tape.

It is another object of the invention to minimize the zenith tilt of the head assembly to insure proper head/tape engagement and tracking during reading and writing operations.

It is a further object of the invention to place the electronically controlled voice coil motor (VCM) drive controlling the tracking of the read/write head to the data track in a location far enough from the read/write head that the stray flux does not interfere with the read/write function.

SUMMARY OF THE INVENTION

The shortcomings of the prior art are overcome and the objects of the invention are accomplished by the servo tracking carriage and drive of this invention.

A carriage is supported for coarse movement in a direction perpendicular to the tape movement path. The carriage is driven by a lead screw/follower nut arrangement wherein the follower nut is rotated about the screw to provide the necessary drive to cause the nut to move longitudinally of the screw. The movement of the nut causes the carriage to be driven in a direction parallel to the axis of the lead screw in response to a stepper motor rotating the nut. The coarse drive of the stepper motor is used to position the head, and particularly the read/write gap of the head, over the desired data track. The coarse control or open-loop stepper motor control is used exclusively when reading and writing the uncontrolled data tracks of the early level data cartridges.

Also, in order to accommodate the servo tracking capability control for cartridges with servo tracks, the carriage is provided with a servo-controlled head positioning arrangement. The read/write head is supported on links of a four-bar linkage. The linkage is pivoted on the carriage and provides a movement of the head in small increments within a shallow arc which substantially parallels the carriage mount pivot points. The movement of the head is controlled by a servo controlled actuator, preferably a VCM, but a piezoelectric device or other electrically controllable drive device could be used. The four-bar linkage supports one portion of the VCM with the second portion of the VCM rigidly mounted to the carriage.

Whenever the four-bar mechanism is formed of rigid links, it may be a single four-bar or a double four-bar mechanism whereby the bars supporting the read/write head extend beyond the carriage pivots to form a second four-bar linkage which reflects the movement of the opposite end of the linkage assembly. The second four-bar linkage may be used as the VCM drive portion of the head positioning apparatus. This type of arrangement has the advantage of removing the VCM from close proximity to the magnetic read/write head and the magnetic tape and thereby reducing strong magnetic flux which could degrade the quality of the recording or reading of the magnetic tape or destroy the recorded data on the magnetic tape.

The servo control head positioning assembly may be formed of a pair of beamsprings cantilevered from the carriage with the beamsprings attached to the read/write head support or may be joined by an intermediate portion of the material from which the leaf springs are fabricated. The intermediate position serves as a mounting member to attach the beam springs to the carriage. The beam springs may be deflected to cause the necessary movement of the read/write head to follow the servo track and thus to follow the data track being read or recorded.

The deflection of the read/write head and the supporting beam springs may be accomplished by mounting the coil of a VCM on the read/write head support and magnetically displacing the coil relative to the pole pieces disposed adjacent thereto; or the VCM coil may be attached to a rocker beam that is pivotally mounted to respond to electrical signals provided to the VCM coil. Movement of the VCM coil translates into movement of the rocker beam forcing the head to move, deflecting the ends of the beam springs.

An alternative approach is to pivot a rigid beam at the midpoint and dispose the read/write head on one end of the beam. The second or opposite end supports the VCM coil. The VCM coil is disposed between pole plates of the VCM, and electrical signals provided to the VCM coil will control the relative position of the coil and the pole plates. The bar must be long enough to prevent the zenith tilt of the read/write head from exceeding the maximum allowable during excursions between the limits of travel necessary to follow the servo track on the tape.

Another approach is to attach a rigid beam member to the back or non-recording surface of the read/write head. This beam must be of a non-magnetic material and will extend between cantilevered beam springs from the read/write head and into proximity of the magnetic pole plates of a VCM. The coil of the VCM is rigidly attached to the beam and may be moved by the magnetic interaction between the coil and pole plates. The beam springs will restrain the tendency to rotate the beam about its attachment point on the magnetic head and will convert the coil displacement to a corresponding displacement of the read/write head. This arrangement also could be implemented in a rigid link four-bar mechanism in which the mass of the head, beam, coil and four-bar links is not large enough to restrict the responsiveness required to track the servo tracks.

In order to make the tape drive compatible with older, non-servo cartridges, the servo aspect of the carriage must be controllably disabled. This disabling may be accomplished by blocking movement of the magnetic read/write head, driving the read/write head support to a known position, or providing a sufficiently rigid head support that a lock is not required but the head support may still be deflected in the servo-controlled mode.

A rocker beam which pivots to transfer coil movement to head movement may be provided with an arm or surface that is engagable by a lock arm or locking device which may be pivotally disposed on the cartridge and detented with respect to the cartridge. The lock/unlock operation may be actuated by driving the carriage to engage the lock arm with a rigid portion of the frame of the tape drive or the bridge supporting the carriage. Causing the lock arm to pivot into or out of a position where the rocker beam is trapped renders the rocker beam immobile and disables the servo capability of the tape drive. With the rocker beam immobile, the head is also immobile.

Control of the lockout may be accomplished by reading a control characteristic on the cartridge of a servo tracked cartridge and enabling the tape drive to accommodate the servo track cartridge. The servo track type cartridge may have an aperture which may be read by an optical sensor or by a mechanical finger. Alternatively, the surface of the magnetic tape cartridge may carry an optically readable code indicating to the servo control that servo track following is required. For non-servo track tapes, the servo control either may be deactivated or energized to drive the read/write head against rigid carriage surfaces.

For servo inhibiting where the VCM is incorporated into the rigid beam discussed above, the servo control may drive the VCM to a limit of travel defined by a stop surface of a portion of the tape drive frame and maintain the VCM coil in that position during open-loop operation.

The use of beamsprings, which are sufficiently stiff or rigid to hold the read/write head against the stiction and dynamic friction forces of the tape acting on the read/write head, together with a VCM of sufficient strength to deflect the stiff beam springs during servo-controlled operation may eliminate the need for a separate lockout of the servo mechanism for use with older non-servo cartridges.

A more complete understanding of this invention may be had from the attached drawings and the detailed description of the invention that follow.

DETAILED DESCRIPTION OF THE PREFERRED EMBODIMENT OF THE BEST MODE AS CONTEMPLATED BY THE INVENTORS FOR CARRYING OUT THE INVENTION

Figure 1:
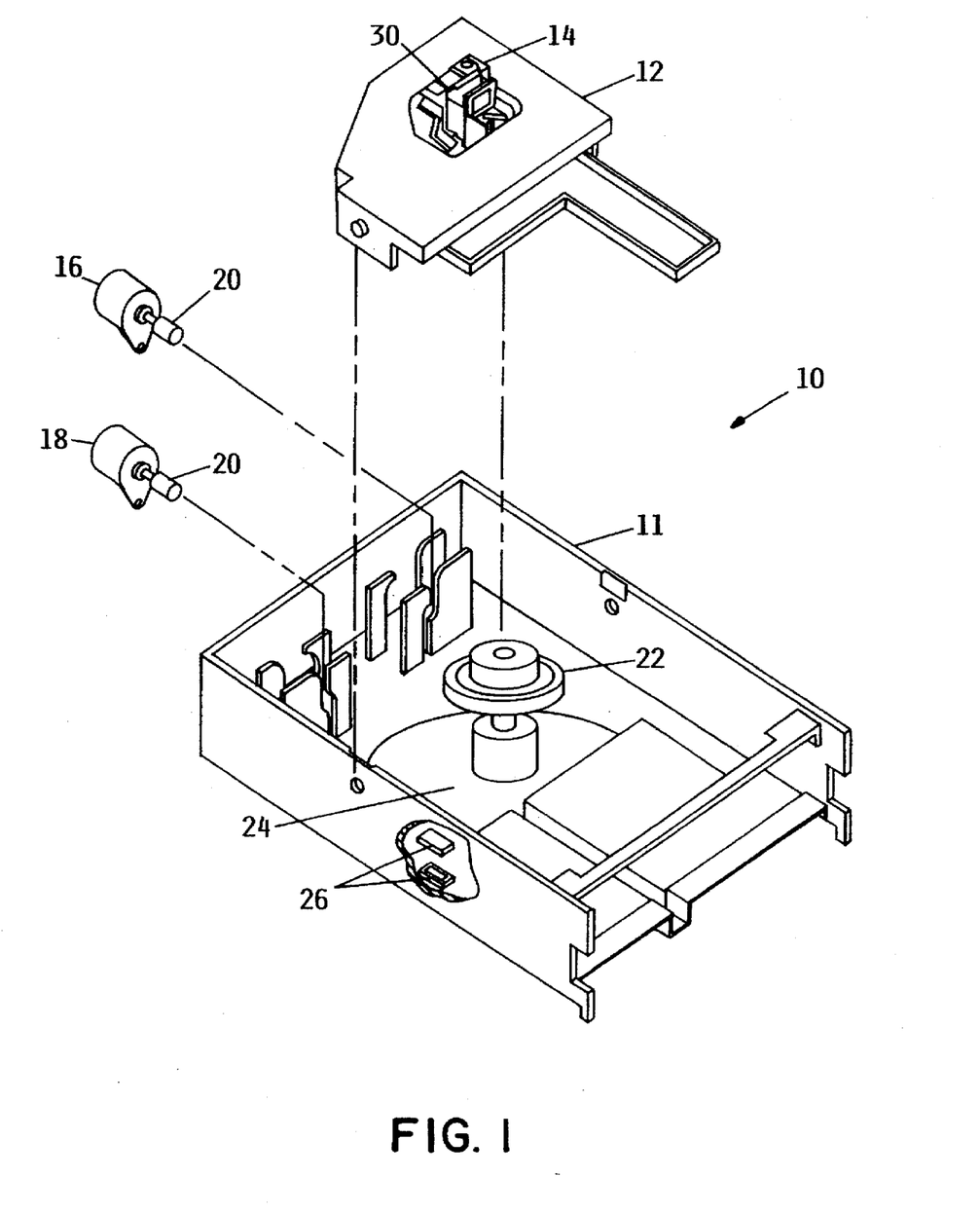
FIG. 1 is a perspective view of a partially disassembled tape drive, having the cover removed for visibility.

Referring initially to FIG. 1, there is illustrated a partial tape drive of the type in which the invention may be used.

FIG. 1 illustrates tape drive 10 with the cover removed for visibility and with bridge 12 exploded out and removed from the tape drive chassis 11. The bridge 12 supports the magnetic read/write head positioning assembly 14. Read/write head positioning assembly 14 is illustrated in FIG. 2 as an exploded view and will be addressed in more detail with that figure.

Stepper motors 16 and 18 are supported by chassis 11 of the tape drive 10. Read/write head positioning stepper motor 16 through gear 20, preferably a worm gear, provides the positioning drive to position the read/write head positioning assembly 14 relative to bridge 12. Tape cartridge receive/eject stepper motor 18 provides the drive for receiving and ejecting cartridges (not shown) from the tape drive 10.

Tape drive 10 is further provided with the capstan drive 22 necessary to feed the tape, not shown. Capstan drive 22 comprises a soft rubber wheel or roller to engage the tape of a cartridge for feeding purposes and is driven by capstan drive motor 24. The tape drive 10 further includes a cartridge sensor 26. Cartridge sensor 26 may be advantageously disposed in an area where no other elements of the tape drive 10 need be present nor where the cartridge will be resident. Further, cartridge sensor 26 is comprised of a pair of electronic elements, typically a light emitting diode and a photo detector forming a LED photo/receptor pair. The cartridge sensor 26 will be discussed in more detail later.

Figure 2:
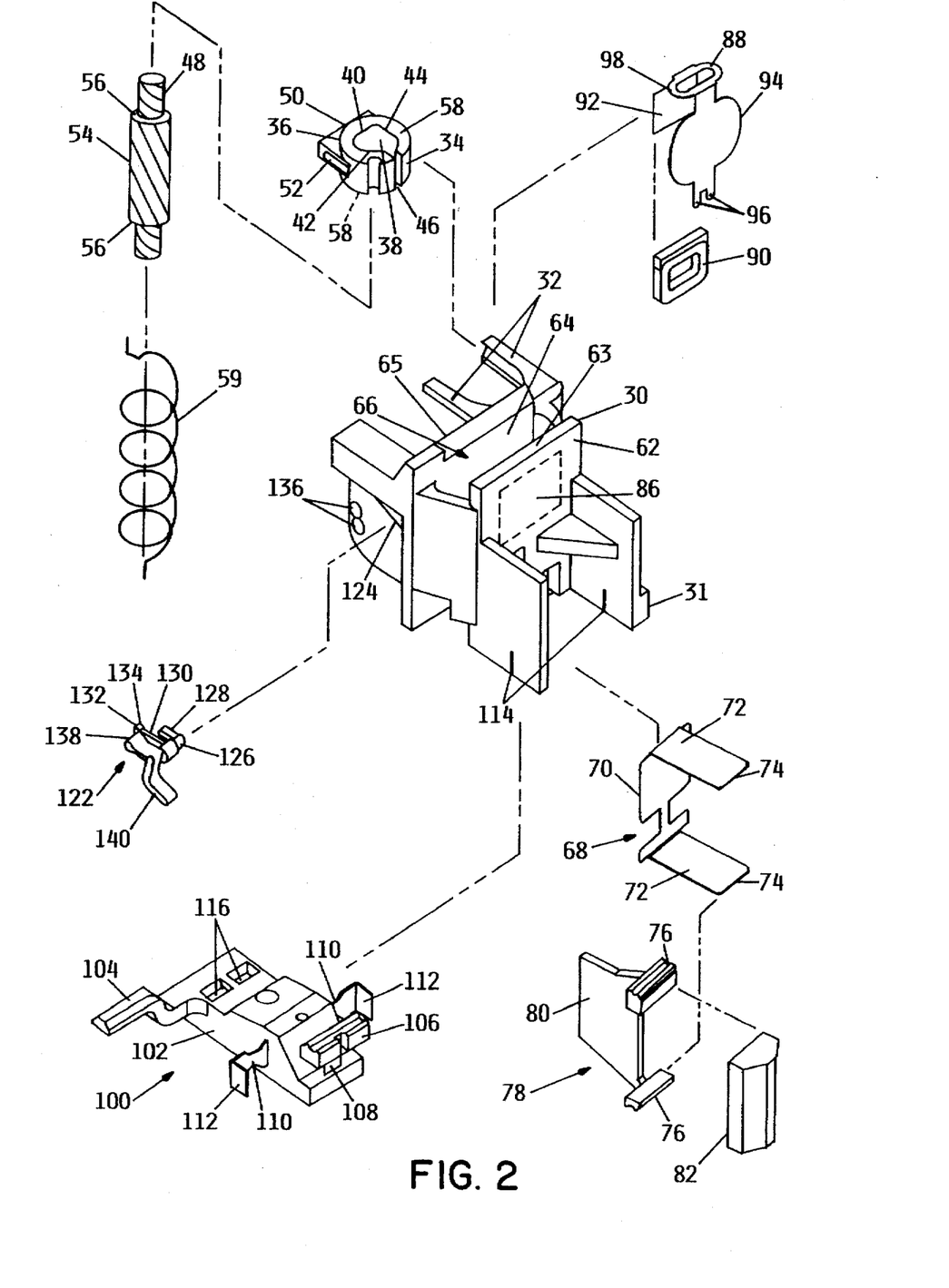
FIG. 2 illustrates the carriage assembly exploded to reveal the characteristics of the various parts thereof.

Referring now to FIG. 2, carriage 30 is illustrated as having a bearing support structure 32. Bearing support structure 32 is comprised of a pair of arms projecting from carriage 30 and which have grooves formed into the facing surfaces thereof to accept bearing 34. Although only one bearing 34 is visible, bearing 34 is duplicated for a substantially identical bearing support structure directly below the one illustrated so that a pair of such bearings 34 are supported by a pair of such support structures 32.

Typically, bearing 34 is molded of a plastic material and is comprised of a cylindrical form 36 having an interior opening 38. The interior opening 38 is characterized by three planar surfaces 40, 42, and 44. A gap 46 in cylindrical form 36 allows the lead screw 48 to be inserted within the interior opening 38. In so doing, planar walls 42 and 44 will be slightly spread apart, widening gap 46. As the cylindrical form 36 attempts to close back to its original state, wall 42 will force the lead screw 48 into a positioning engagement with planar surfaces 40 and 44, thereby insuring accurate placement of the lead screw 48 relative to bearing 34. Bearing 34 is further provided with a partial flange 50 having ribs 52 which will mate with the inner surfaces of bearing support structure 32.

Geared nut 54 is threaded onto lead screw 48 and whenever lead screw 48 is held stationary by mounting the lead screw 48 into bridge 12, the rotation of geared nut 54 by worm gear 20 on the read/write head positioning stepper motor 16 will cause nut 54 to be progressively raised or lowered with respect to lead screw 48. The end surfaces 56 of geared nut 54 lie in abutting relationship to the end surface 58 of bearing 34. The force controlling the raising and lowering of the carriage 30 is exerted on the bottom bearing 34 due to the influence of the pre-load spring 59 which engages carriage 30 and bridge 12 to bias the carriage 30 upward. Pre-load spring 59 maintains contact between geared nut 54 and bottom bearing 34 except when carriage 30 is driven to an end-of-track position such as when the servo-control latch is activated.

Carriage 30 has a pair of parallel vertical walls 62 and 64. Vertical walls 62 and 64 form a cavity 66 which will be more fully explained later. The carriage 30, made of a soft magnetic material, can carry magnetic flux of a VCM and will aid in controlling stray flux and help to prevent adverse effects of stray magnetic fields on the magnetic tape. If desired, only walls 62,64 need be of a soft magnetic material. Additionally carriage 30 provided with an anti-rotation boss 31 disposed as close to the read/write head 82 as possible to prevent undue rotation of carriage 30 under the influence of spring 59. Anti-rotation boss 31 slideably engages bridge 12 and provides a consistent datum relative to bridge 12.

To mount the read/write head 82 on carriage 30, leaf spring 68 is formed of thin flat spring stock and is bent to result in a "C" shape or three sides of a rectangle. The middle side 70 of the rectangle 68 is attached at its ends to cantilevered beam springs 72. Middle section 70 is attachable to vertical wall 62 with epoxy or other suitable adhesives. The free ends 74 of beam springs 72 are attached to attachment bars 76 of web 78. Web 78 is formed having a planar section 80 and two attachment bars 76 and may be integrally molded of plastic or other suitable material for ease of fabrication. Attachment bars 76 may be adhesively bonded or insert molded onto the free ends 74 of cantilever beam sections 72, thereby maintaining a constant spacing between the free ends 74 of springs 72 and adding rigidity to the structure in a twisting mode. The free ends 74 of beam springs 72 may flex up and down even when attached to the attachment bars 76 of web 78. Planar section 80 serves to space the attachment bars 76 from each other while also providing a structure to route the electrical signal conductors to and from the magnetic head 82. Magnetic head 82 then may be positioned relative to attachment bar 76 and cemented with epoxy or comparable material to the attachment bars 76. The assembly of leaf spring 68, web 78 and magnetic head 82 provides for limited movement of magnetic head 82 up and down, but it cannot readily be turned about in any other axis or deflected in any other degree of motion.

To effect the movement for magnetic head 82 described above, a VCM comprising a voice coil 90 and a magnet 86 are provided. A magnet 86 is adhesively attached to the back side 63 of vertical wall 62 within cavity 66. Voice coil 90 is attached using a similar technique to the coil mounting pad 94 of VCM spring 88.

VCM spring 88 is provided having a mounting pad or attachment pad 92 which permits the adhesive attachment of VCM spring 88 to the back surface 65 of vertical wall 64 with the voice coil 90 disposed within cavity 66. VCM spring 88 also has an oval span 98 intermediate to the attachment pad 92 and the coil mount pad 94. The oval span 98 provides flexibility and the ability to move the coil mount pad 94 vertically within limits with respect to attachment pad 92. By disposing the voice coil 90 and magnet 86 within cavity 66, a closed VCM magnetic circuit is formed and stray or fringing flux is contained close to the VCM and away from the magnetic read/write head 82 and magnetic tape (not shown in FIG. 2).

Extending from the bottom portion of coil mount pad 94 are connection tabs 96 which serve to accept a connecting material such as an epoxy to connect the coil mount pad 94 to the rocker 100 for bi-directional movement with the rocker 100.

Rocker 100 is formed as a beam member 102 having a latch arm 104 extending from one side thereof. On the opposite end of beam member 102 from latch arm 104 is a push bar 106 attached by a flexible support 108. Flexures 110 protrude from the sides of beam 102. Flexures 110 made of a thin leaf spring material have been formed with tabs 112 to assist in positioning flexures 110 within slots 114 of carriage 30. Resident within slots 114, flexures 110 provide adequate bending capability and capacity to permit the rocker 100 to oscillate over a limited oscillation range. Rocker 100 is further provided with recesses 116 into which connection tabs 96 are inserted and permanently attached by an epoxy or comparable adhesive material.

Push bar 106 is engagable with and attached to beamspring end 74 of cantilever beamspring 72 which resides on the bottom of the spring 68. Push bar 106 is cemented with epoxy or comparable material to connect push bar 106 to the leaf spring 68/web 78/magnetic head 82 assembly. The flexible web 108 interconnects the end of beam 102 and push bar 106 and provides mobility to push bar 106 with respect to the end of beam 102, thereby accommodating any slight misalignment which occurs whenever rocker 100 pivots about flexure 110 and does not perfectly follow the translation of magnetic head 82. Web 108 further minimizes any forces caused by the rocker beam 102 which may tend to urge the magnetic head 82 away from the magnetic tape surface, thereby preventing degradation of the recording or reading of the data on the tape.

In order to disable the servo control of the read/write head positioning apparatus 14, a lock arm 122 is provided. Lock arm 122 is mounted on carriage 30 and rides therewith.

Carriage 30 defines a slot 124 which will accept shaft 126 and keeper 128. Keeper 128 and the end of shaft 126 are inserted into slot 124 whenever aligned; and then by turning lock arm 122, the keeper 128 will become misaligned with slot 124 and thereby retain lock arm 122 on and movable with respect to carriage 30. Lock arm 122 is further provided with a detent arm 130 which carries a detent head 132. Detent head 132 includes an engaging surface 134 which will mate with and engage detent depressions 136 on carriage 30. Further provided to lock arm 122 are engagement arm 138 and arm 140.

Figure 8:
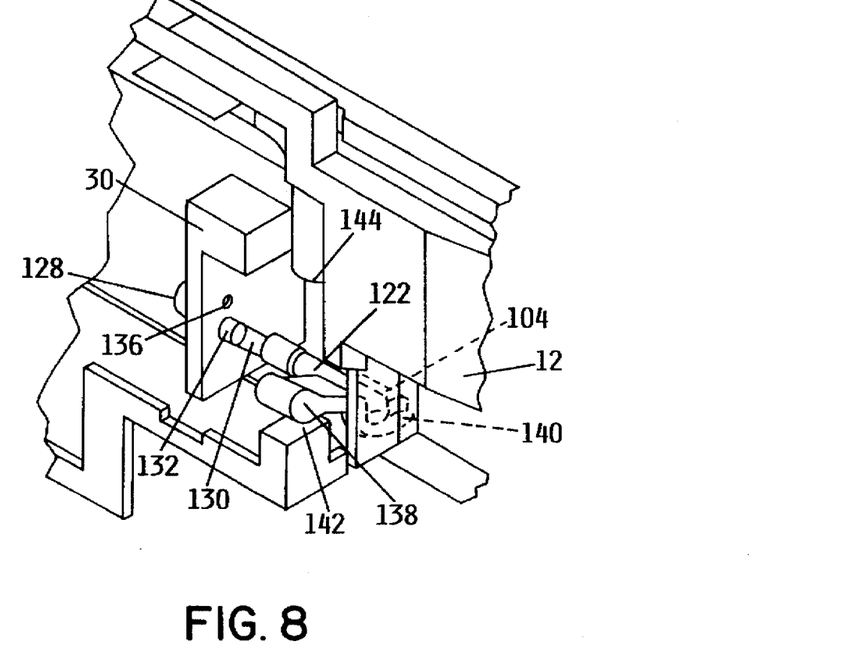
FIG. 8 illustrates a segment of the carriage of the servo track following tape drive and a segment of the bridge supporting the carriage together with the servo lockout device and its interaction with the bridge.

Referring now to FIGS. 2 and 8, engagement arm 138 may be displaced by engagement with a portion of the bridge 12 of the tape drive 10. Bridge 12 has stop surfaces 142, 144 onto which engagement arm 138 may be moved to cause pivoting about shaft 126 of the entire lock arm 122. The arm 140 when pivoted by engagement arm 138 will engage the undersurface of rocker latch arm 104. With arm 140 below and in engagement with rocker latch arm 104, rocker 100 can not freely rotate and is latched. Accordingly the servo tracking movement of magnetic head 82 is disabled and the position of magnetic head 82 and position detent is totally dependent upon the position of the carriage 30. Detent surface 134 resides in one or the other of the detent depressions 136. The lower of the two detent depressions 136 defines the position of lock arm 122 in which the servo mechanism is locked out or disabled. Thus, in order to operate the lock arm 122 to cause disabling of the servo mechanism, the carriage 30 must be driven upward until engagement arm 138 engages the stop surface 144 on the bridge 12. The engagement relationship between the bridge 12 and the carriage 30 with regard to activation and deactivation of the lock arm 122 will become more apparent in FIG. 8 to be discussed below.

Figure 3:
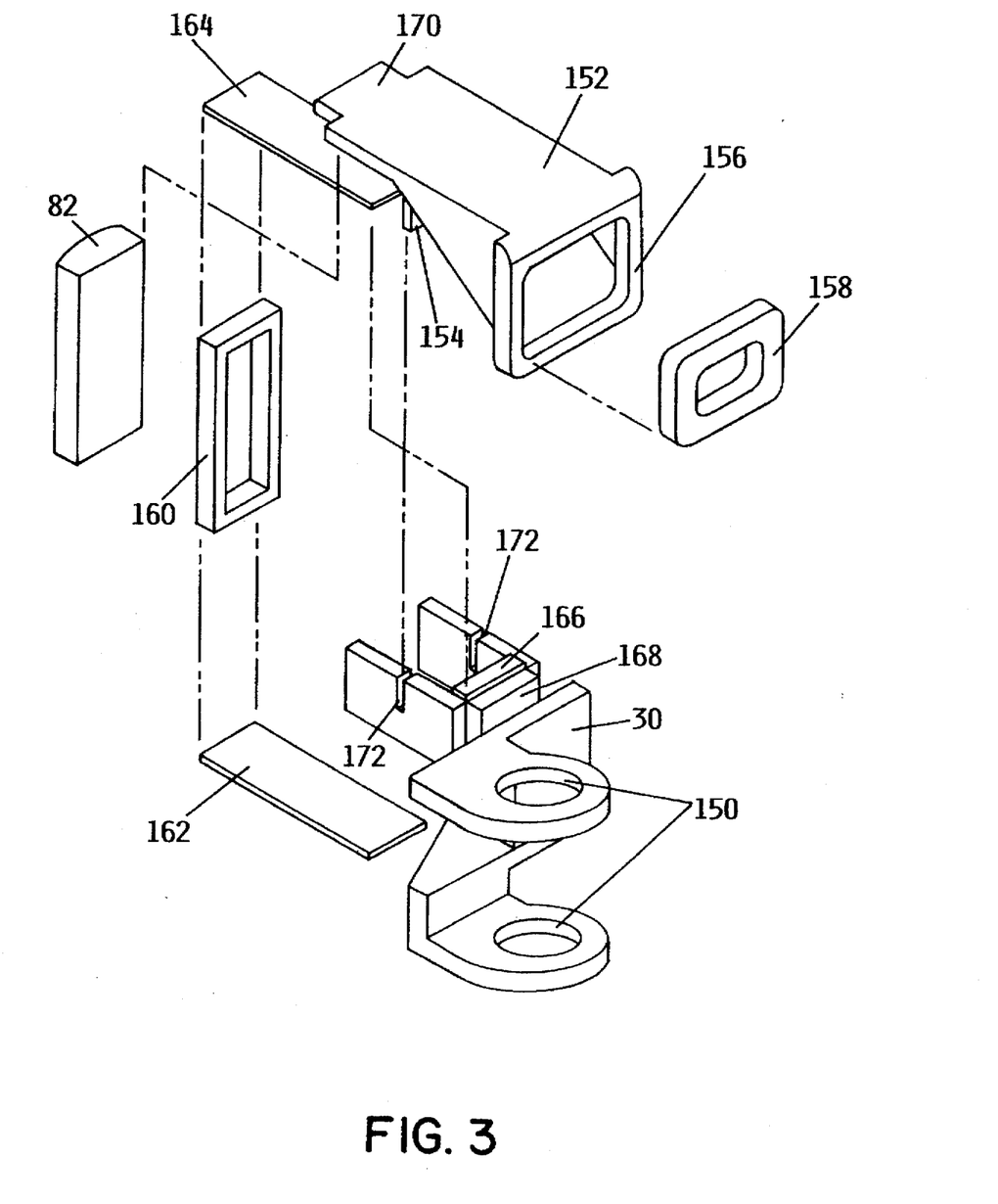
FIG. 3 is an exploded view of a second embodiment of the carriage and particularly the magnetic read/write head positioning control.

Referring now to FIG. 3, an alternative embodiment of the read/write head positioning assembly and carriage, the carriage 30 is illustrated with circular bearing supports 150 instead of the "U" shaped bearing supports illustrated in FIG. 2. However the bearing support structure of FIG. 2 could be implemented into this carriage 30, if desired.

Rocker beam 152 is shown with a pivot flexure tab 154. Flexure tab 154 and a similar tab on the other side, not visible, may be inserted into slots 172 of carriage 30 and thereby provide a pivot axis for rocker beam 152. Rocker beam 152 is further provided with a coil cage 156 which will accept and mount VCM coil 158. Magnetic head support 160 is attached to the ends of beam springs 162, 164 and further may be used to attach a magnetic head 82. The opposite ends of beam springs 162 and 164 are attached to carriage 30, the beam spring 164 attached to a spring attachment surface 166 while beam spring 162 is attached to an opposite surface which is not visible.

With the beam springs, 162, 164 the carriage 30 and the magnetic head support 160 all assembled, a mechanism equivalent to a four-bar linkage permits movement of the magnetic head support 160 and magnetic head 82 in one degree of freedom. VCM magnet 168 is shown attached to the carriage 30 in proximity to VCM coil 158, thereby providing the components of a VCM controlling the displacement of magnetic head 82. Rocker beam 152, particularly the outboard end 170 thereof, engages magnetic head 82 and with the rocking of rocker beam 152 will cause the displacement of magnetic head 82 by a controllable amount.

Figure 4:
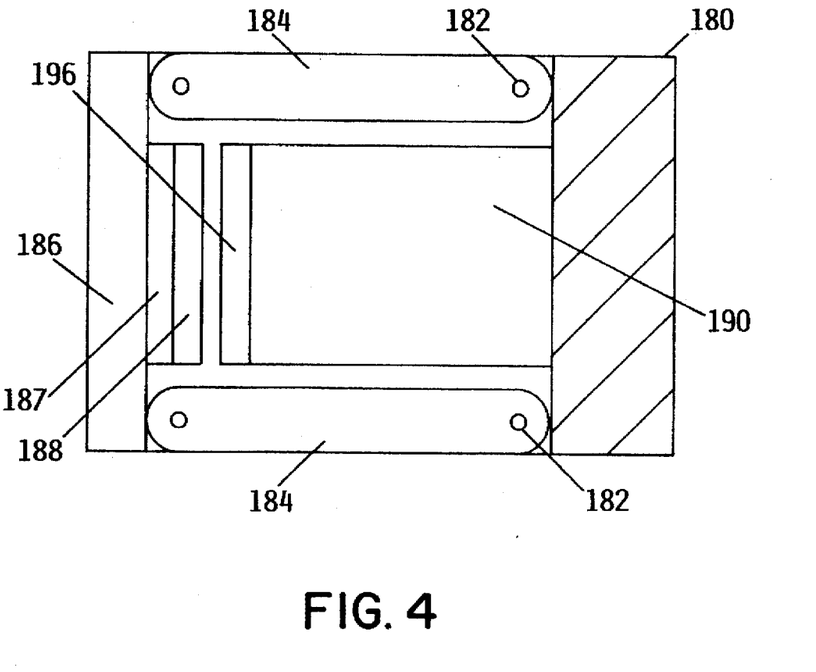
FIG. 4 illustrates a four-bar mechanism with a VCM coil for controlling the location of the read/write head mounted on the back side of the read/write head.

Referring now to FIG. 4, there is illustrated a simple rigid four-bar mechanism which could be used in the carriage 30 of the invention if desired. Support 180, a portion of a carriage similar to carriage 30, is provided with pivot points 182. Pivot points 182 are part of links 184 which, in turn, are pivotally attached to magnetic head or head support 186. To this point the structure is a classic four-bar linkage mechanism, and movement of the magnetic head/support 186 will result in a movement whereby magnetic head/support 186 remains parallel to the plane defined by the pivot points 182 as long as links 184 are identical in length. An extension of support 180, support beam 190, protrudes toward magnetic head/support 186. On the back surface (non-recording surface) of magnetic head/support 186 is fixedly attached a pole plate 187 and magnet 188 for a VCM. Pole plate 187 and magnet 188 are juxtaposed with VCM coil 196 mounted on the end of support beam 190 made of a soft magnetic material. This moving magnet and moving pole design may be changed to a moving coil design with magnet and pole fixed. Control of the movement of the four-bar linkage including magnetic head/support 186 then may be controlled by an electrical current provided to VCM coil 196.

Figure 5:
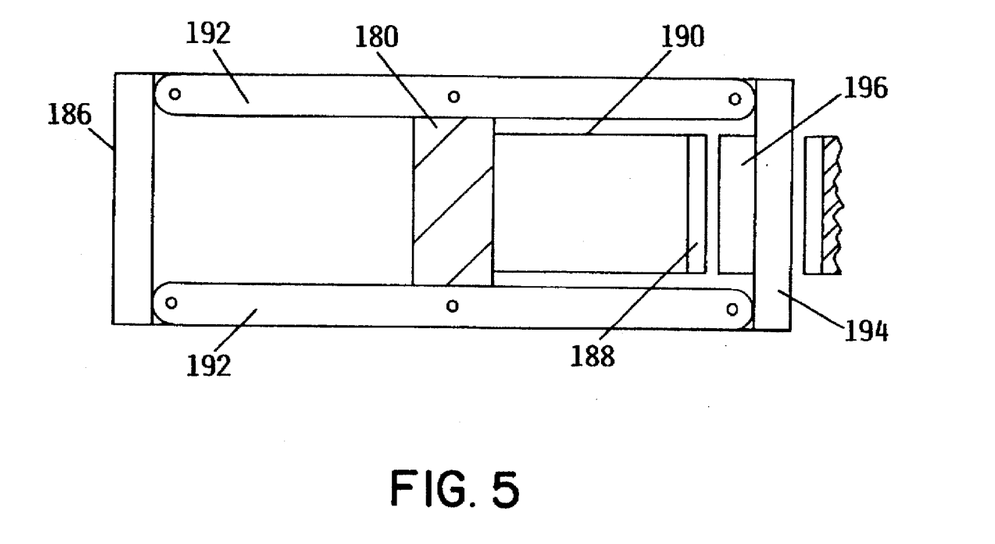
FIG. 5 illustrates a double four-bar linkage with the extended links common to both linkages pivoted on a fixed member, and the read/write head supported on the ends of the pivoting member on one end and a VCM coil disposed on the opposite ends of the pivoting members for interaction with the voice coil magnet plate.

FIG. 5 expands the concept of the four-bar linkage mechanism illustrated in FIG. 4. Support 180 pivotally supports links 192 which, in turn, are pivotally connected to magnetic head/support 186, completing a four-bar mechanism. The opposite ends of links 192, which extend beyond support 180, are pivotally connected to VCM link 194. Link 194 supports a VCM coil 196. Support 180 has an extension beam 190 protruding outwardly therefrom and supports on its end face magnet 188 juxtaposed with VCM coil 196. The advantages of this arrangement, FIG. 5, over that illustrated in FIG. 4 are in the removal of the voice coil 196 and magnet 188 from proximity to the magnetic head/support 186 which reduces stray flux near the magnetic head, creates a balanced actuator which resists shock and vibration, and places fewer design constraints on the electrically controlled drive.

Figure 6:
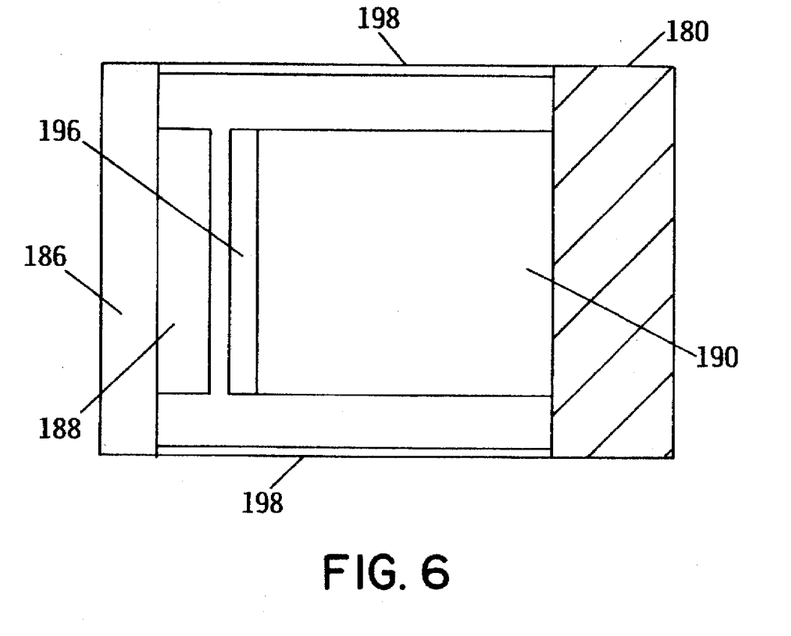
FIG. 6 illustrates the support of a magnetic read/write head on cantilevered beam springs which in turn are supported by a fixed member of the carriage.

FIG. 6 is a flexible beam implementation of the servo mechanism illustrated in FIG. 4 with beam springs 198 replacing links 184 in FIG. 4. The primary advantage to this arrangement is the elimination of the need for pivots and rigid links such as illustrated in FIGS. 4 and 5.

Figure 7:
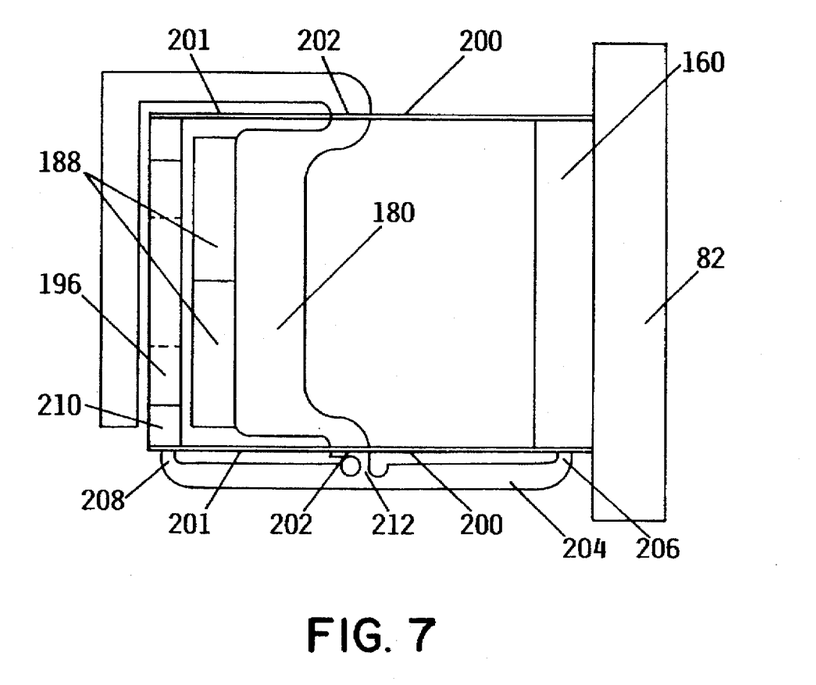
FIG. 7 illustrates an alternative embodiment of a servo mechanism carriage and servo positioned magnetic read/write head utilizing beam springs and a VCM.

Referring to FIG. 7, support 180 either may be separate or may be an integral part of a carriage such as carriage 30. Support 180 is provided with anchor points 202 which trap and hold leaf springs 200, 201. The anchoring of leaf springs 200, 201 at anchor points 202 has the effect of forming two separate leaf springs 200, 201 out of a single piece of leaf spring material. Each set or branch of the leaf springs 200, 201 may be deflected independently of the other. Leaf springs 200 are bonded to and support magnetic head support 160 and in turn magnetic head 82. Leaf springs 201 are attached to and support VCM coil frame 210, which in turn supports VCM coil 196. Support 180 further supports VCM magnet 188 juxtaposed to coil 196. Rocker 204 is a portion of support 180 and is capable of being flexed about flexure point 212. Flexure point 212 is a narrowed section of the material making up a support 180 and rocker 204. The ends of rocker 204 are formed into flexures 206 and 208 and may be attached to the magnetic head support 160 and the VCM coil frame 210, respectively. Attachment of the flexures 206, 208 to members 160, 210 or alternatively integrally forming these members with the rocker 204 insures that movement of the rocker 204 is translated into positive displacement of the members to which it is attached or to which it is an integral part.

Under the influence of a magnetic field created by electric current passing through VCM coil 196 and interacting with the magnetic field of VCM magnet 188, one can appreciate that movement of the VCM coil 196 will cause a rocking of rocker 204 to displace magnetic head support 160.

Reference is now made to FIG. 8 to illustrate a small section of bridge 12 and a portion of carriage 30. More specifically, the illustration in FIG. 8 illustrates the relationship between lock arm 122 and control surfaces on bridge 12. Lock arm 122 is totally supported by shaft 126 on carriage 30. Detent head 132, on detent arm 130 extending along carriage 30, engages a detent depression 136. A second detent depression 136 is positioned closely adjacent and engagable by detent head 132 whenever lock arm 122 is displaced. Engagement arm 138, a part of lock arm 122, extends from shaft 126. As carriage 30 and lock arm 122 are moved upward and downward as described with reference to FIG. 2, engagement arm 138 will engage stop surface 144 and stop surface 142 respectively. As the engagement occurs between engagement arm 138 and stop surface 144 of bridge 12 and carriage 30 is further driven upward, engagement arm 138 will cease to move upward and will cause rotation of lock arm 122 into the position illustrated in FIG. 8. Conversely, if carriage 30 is driven downward, engagement arm 138 will engage stop surface 142 and be pivoted in response to continued movement of carriage 30 so that the detent arm 130 engages detent surface 136.

Thus by viewing FIG. 8 in conjunction with FIG. 2, it can be seen that movement of carriage 30 upward and the engagement of engagement arm 138 and stop surface 144 will pivot the lock arm 122 such that the rocker 100 will be trapped in a fixed position by arm 140, as is shown, engaging rocker latch arm 104 and holding it against movement. The unlatching of the rocker 100 is accomplished by driving engagement arm 138 into engagement with surface 142 and then driving carriage 30 sufficiently past that point of engagement to pivot lock arm 122 to the released position. The amount of rotation of the lock arm 122 and the spacing of detent depressions 136 need not be large since the amount of movement of lock arm 122 is small because the amount of movement of the rocker 100 is small, encompassing less than one degree of rotation.

Figure 9:
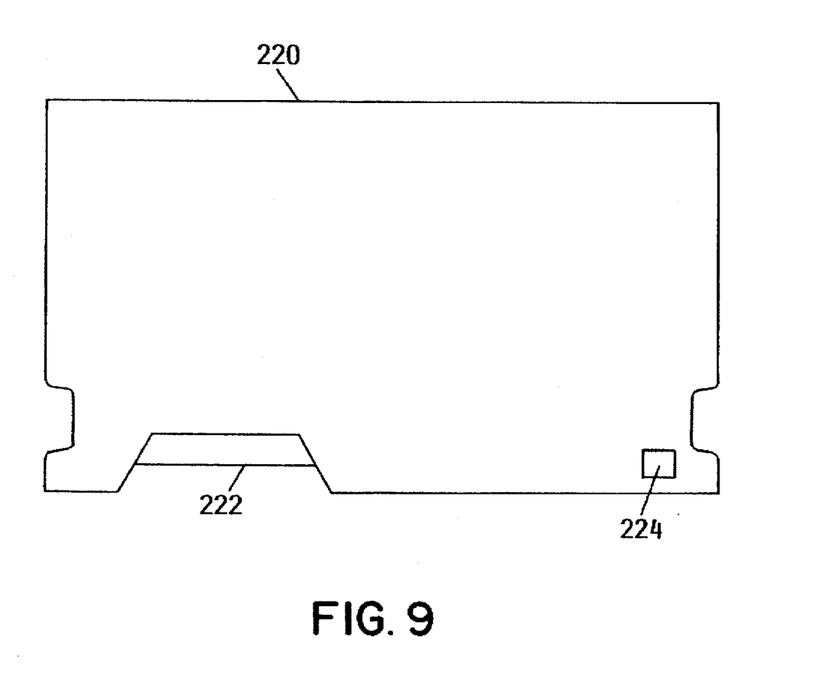
FIG. 9 illustrates a tape cartridge having a control region indicative of the servo track recordings on the tape and its capability to be used with a servo control read/write head positioning apparatus.

Referring now to FIG. 9, which illustrates and outlines a magnetic tape recording cartridge 220 and which exposes a span of magnetic tape 222, there is found in the lower right hand corner an indicia region 224. An indicia region 224 which may take several forms. The indicia region 224 may be an opening extending all the way through the cartridge in this region; and whenever positioned in the tape drive 10, the indicia region 224 will be disposed between the parts of a cartridge sensor 26 illustrated in FIG. 1.

Alternatively, region 224 could be an aperture in either the top surface or the bottom surface of the cartridge 220 which would accept a mechanical sensing finger which could be moved into engagement with the cartridge. The opening would allow the sensor finger to protrude into the volume of the cartridge to indicate that the cartridge is a servo track control cartridge and the servo mechanism of the tape drive 10 would need to be enabled.

In older level cartridges this region 224 would not exist and, accordingly, any attempt to sense it would result in a conclusion that the cartridge was an older, down-level open-loop stepper motor control compatible cartridge. Thus the servo mechanism of the present invention would need to be disabled, overridden, or locked out prior to the attempt to read or write the data from or to the magnetic tape 222.

Figure 10:
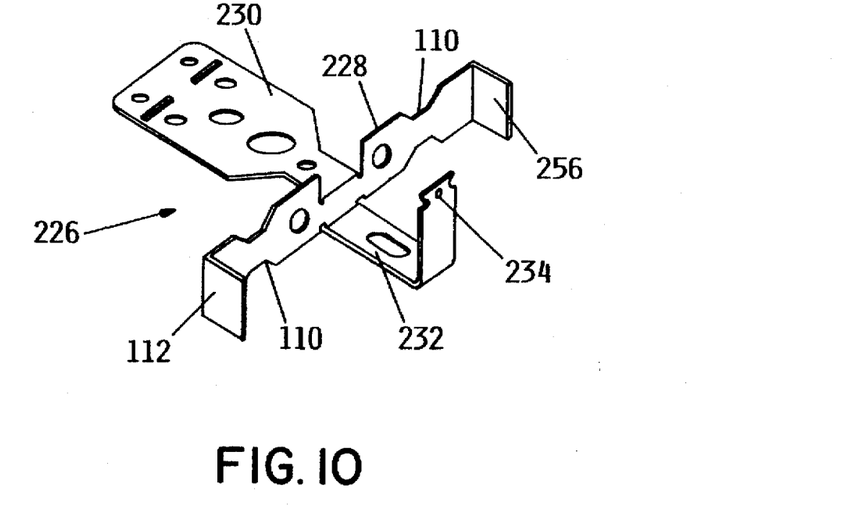
FIG. 10 illustrates a pivot structure which may be advantageously incorporated into the rocker beam of the servo control head positioning apparatus.

Referring now to FIG. 10, a pivot leaf spring 226 is illustrated. Pivot leaf spring 226 is comprised of a plurality of segments, particularly flexures 110 and flexure tabs 112. Extending from beam 228 interconnecting flexures 110 are beams 230 and 232. Beam 230 provides significant area in which plastic of the rocker 100 as shown in FIG. 2 may be incorporated. This flexure spring 226 and particularly beams 230, 232 and the portion of beam 228 between flexures 110 may be insert molded into plastic. The push bar 106 of rocker 100 then may be insert molded around the end of tab 234 with tab 234 providing the web 108 described earlier with respect to FIG. 2.

The formation of the flexure leaf spring 226 and its incorporation into rocker 100 by insert molding enhances the precise control and the resilient return movement of rocker 100 and the movement of VCM coil 90 and magnetic head 82 in FIG. 2.

Figure 11:
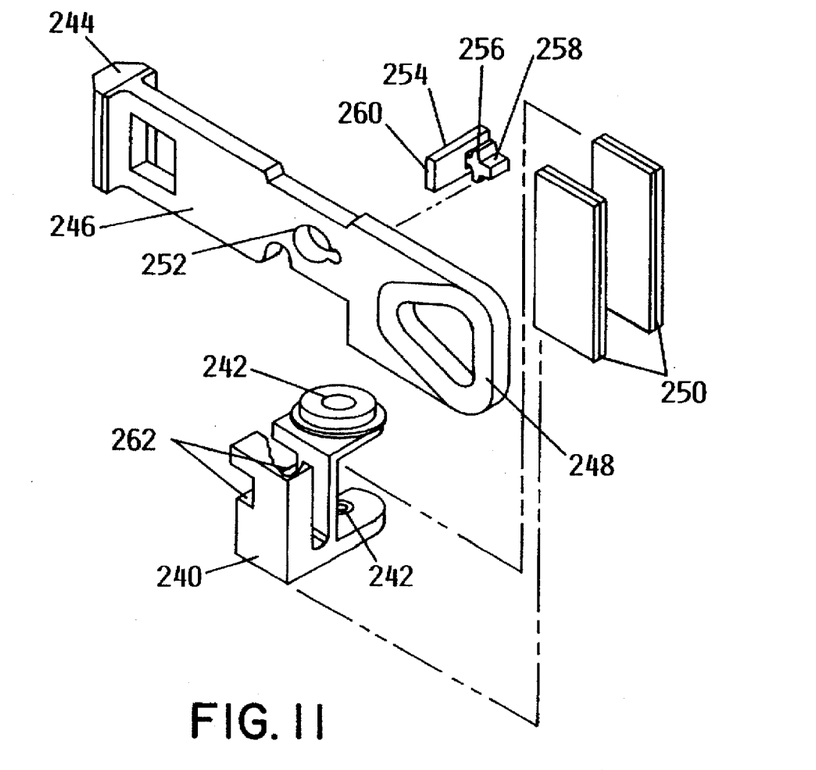
FIG. 11 illustrates a rigid beam member for translating movement of the VCM coil to the recording head and which may be used as an alternative to the beam spring support of the magnetic read/write head.
Figure 12:
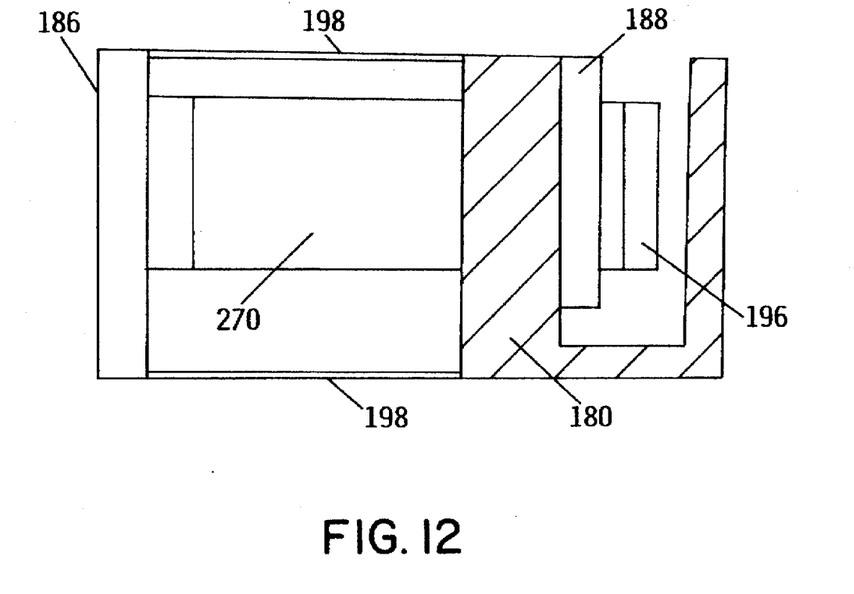
FIG. 12 is an alternative arrangement for the driving of the magnetic head by a VCM in that the magnetic head is suspended on cantilevered beamsprings and the VCM is displaced from the magnetic head to the greatest extent possible.

Further alternatives in the design of the magnetic head positioning apparatus incorporating a servo mechanism are illustrated in FIGS. 11 and 12. Referring now to FIG. 11, there is illustrated an alternative to the carriage 30 and the head positioning assembly 14 carried by carriage 30 illustrated in FIG. 2. Carriage 240 is provided with bushings 242 through which a lead screw essentially the same as lead screw 48 of FIG. 2 can be extended. Bushings 242 will trap a geared nut identical to or analogous to geared nut 54 of FIG. 2 to cause the carriage 240 to be elevated and depressed to select the general region positioning of the magnetic head 244. Beam 246 is provided with a VCM coil 248 fixed and disposed on beam 246. VCM coil 248 is disposed intermediate VCM pole plate/magnet assembly 250 to complete magnetic circuit of the VCM. Beam 246 is formed with an aperture 252 which accommodates a living hinge 256. Living hinge 256 interconnects a mounting member 258 and carriage tabs 260. Carriage tabs 260 are inserted into notches 262 on carriage 240 and act to precisely position the living hinge pivot member 254 relative to the carriage 240.

The apparatus shown in FIG. 11 has the advantages of simplicity, ease in manufacturing and may be disabled from a servoing operation with the provision of a constant electrical voltage to the coil 248 effectively positioning the head 244 in a single position relative to carriage 240. Pole plates/magnet assemblies 250 may be fixed to and carried by an extension of carriage 240 or fixed to a portion of the tape drive frame. The position of the coil 248 and head 244 may be defined by the electrical voltage to the coil 248 or by driving the beam 246 and head 244 to a hard stop in the open-loop mode (not shown).

The desirable aspect of displacing the VCM as far away as possible from the magnetic head 244 is accomplished by the mechanism of FIG. 11. So long as beam 246 is of sufficient length to limit the amount of zenith tilt to less than ¼ degree maximum throughout the excursion of the magnetic head 244 between its limits of travel, this oscillating or pivoted beam arrangement is acceptable.

FIG. 12 is an illustration of a further alternative embodiment where the support 180 provides the support or base for cantilevered beam springs 198. Cantilevered beam springs 198 are attached at their free ends to magnetic head/support 186. Beam 270 is cantilevered from the non-recording surface of magnetic head/support 186 and extends toward support 180 and supports VCM coil 196 juxtaposed to VCM magnet 188 attached to support 180 of a soft magnetic material. Cantilevered beam springs 198 will resist any effort by the VCM components 196, 188 to twist cantilevered beam 270 and thus will cause the upward and downward movement of cantilevered beam 270 along with magnetic head 186. Further, the cantilevered beam springs 198 will act as links of a four-bar linkage thereby insuring that the magnetic head/support 186 will remain substantially parallel to the support 180 during its movements.

The advantage of this arrangement is the displacement of the VCM away from the magnetic head/support 186.

Figure 13:
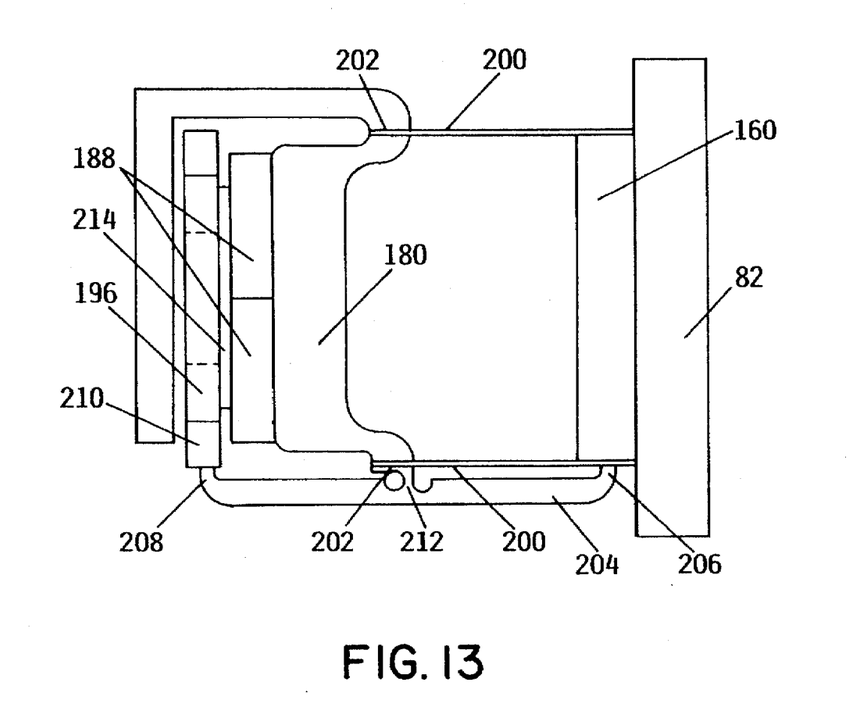
FIG. 13 is an embodiment of the actuator where the VCM coil is not rigidly supported but rather is spaced from and stabilized with respect to the VCM magnet by a mass of silicone gel disposed between the coil and the magnet.

Referring to FIG. 13, the actuator assembly of FIG. 7 is illustrated in modified form. The VCM coil 196 and VCM coil frame 210 are not supported by leaf springs or other structure as found in FIG. 7 The VCM coil 196 and VCM coil frame 210 are connected to rocker 204 at flexure 208 but are not stable. In order to stabilize VCM coil 196 and VCM coil frame 210 relative to the actuator support 180 and VCM magnets 188, a small quantity of visco-elastic material such as a silicone gel 214 is deposited between and in contact with VCM coil 196/VCM coil frame 210 and VCM magnets 188. The silicone gel 214 when cured will adhere to the VCM coil 196/VCM coil frame 210 and VCM magnets 188 stabilizing the coil 196/frame 210. The resilient characteristics of the silicone gel 214 permits the displacement of the coil 196/frame 210 relative to actuator support 180 and magnets 188.

A similar result may be had by removing attachment pad 92 and oval span 98 of VCM spring 88 in FIG. 2 and inserting silicone gel 214 between coil mount pad 94 and magnet 86 and curing the silicone gel.

The operation of the read/write head positioning assembly of FIG. 2 has two possible modes of operation: one being in the servo control mode, and the other being in the open-loop stepper motor mode.

For the open-loop stepper motor mode, upon detection of cartridge of a cartridge 220 without an indicia region 224 or equivalent activating characteristics, the carriage in FIG. 2 and FIG. 8 is driven by the stepper motor 16 in an upward direction until lock arm 122 is shifted to a position whereby the arm 140 of lock arm 122 engages and traps the rocker latch arm 104, thus stabilizing the magnetic head 82 with respect to carriage 30. Thereafter, stepper motor 16 drives the geared nut 54 to raise and lower carriage 30 to position the read/write head 82 over a data track. The carriage 30 remains in that position so long as the same data track is being accessed by the read/write head 82, thereafter the accessing of various tracks on the magnetic tape is accomplished by driving stepper motor 16 a predetermined number of steps to increment the magnetic read/write head 82 to a position where it will correspond with the predetermined position of a selected magnetic track on the magnetic tape in a cartridge.

Assuming that the tape drive 10 has most recently operated in an open-loop stepper motor accessing of tape tracks and the servo compatible cartridge 220 is inserted into tape drive 10, the cartridge sensor 26 will detect the characteristic of indicia region 224 of the cartridge 220 and will signal the electronic controls of the tape drive 10 to drive the carriage 30 downward until the lock arm 122 engages stop surface 142 rotating lock arm 122 to disengage from the rocker latch arm 104. Once the rocker latch arm 104 has been freed, rocker latch arm 104 and rocker 100 are free to be moved and influenced by the movement of VCM coil 90. Thereafter carriage 30 either is incremented to its first position for accessing a desired data track or the read/write gap of the magnetic head 82 is placed in proximity to the desired data track and a read only gap on the magnetic head 82 is placed in proximity of a servo track recorded on tape 222 of cartridge 220. The read only gap of the magnetic head 82 will sense the servo track and provide an electrical signal to the servo control circuitry of the tape drive 10. The servo control circuitry in turn will provide a drive signal of controlled but variable voltage to the VCM coil 90 creating a magnetic field which will interact with the magnetic field generated by the VCM magnet 88. The magnetic fields interacting will move the coil 90 a small amount thus positioning the magnetic head 82 with its read gap tracking the servo track of the tape 222 and read/write gaps following the data tracks on tape 222. As the read only gap is moved, the electrical signal generated by it indicating its position relative to the servo track on the magnetic tape 222 will vary causing a variance of the signal provided to the coil 90 of the VCM.

Due to the control over the position of the magnetic head 82 relative to the magnetic tape 222, and relative to the servo tracks and data tracks recorded thereon, a magnetic tape with a much higher density recording pattern may be utilized whenever in the servo control mode. The signals derived by the servo electronics from the magnetic read head gap provided to the VCM coil may be provided by a conventional electronic servo circuitry and therefore need not be described in detail.

Alternative approaches to the physical latching or disabling of rocker 100 include the electrical energization of the VCM at a constant voltage to hold the voice coil in a fixed position relative to the carriage, in effect creating a fixed position for the read/write head relative to the carriage.

While various embodiments of various portions of this tape drive have been disclosed, it will be recognized that one of skill in the art may make minor variations and modifications to any or all of the various embodiments without removing the apparatus from the scope of the appended claims which define the invention.

We claim:

1. A high density data storage tape drive for use with a removable cartridge having a pair of spools and containing a length of storage tape comprising:

a frame;

a drive connection engageable with said cartridge to spool tape from one of said spools to another of said spools;

a read/write head disposed adjacent to said storage tape;

said read/write head supported on a carriage, said carriage displaceable relative to said storage tape in coarse increments, said head displaceable relative to said carriage and said storage tape in finer increments;

said head supported by at least a pair of cantilevered members at free ends of said members and one pivoted member, said pivoted member supported on and pivoted on said carriage;

said pivoted member controlled by a voice coil motor, said voice coil motor comprised of at least a coil of wire and a magnet, said carriage supporting in a fixed position, one of said magnet and said coil of wire and said pivoted member supporting the other of said coil of wire and said magnet;

said pivoted member engaging said head and pivotally responsive to movement of one element of said voice coil motor to displace said head against forces exerted by said cantilevered members;

whereby said carriage may be coarsely displaced to position said read/write head relative to said storage tape and said head may be further positioned in fine increments relative to said tape by said voice coil motor.

2. The high density data storage tape drive of claim 1 wherein said pivoted member is one of a plurality of pivotable members disposed on and movable relative to said carriage.

3. The high density data storage tape drive of claim 2 wherein said plurality of pivotable members form a four bar linkage wherein one link of said linkage is a portion of said carriage.

4. The high density data storage tape drive of claim 3 wherein two of said links, pivoted to said carriage, extend beyond their respective pivots and are joined together by an interconnecting link, said interconnecting link supporting said coil of said voice coil motor.

5. The high density data storage tape drive of claim 3 wherein said read/write head is supported on a link of said four bar linkage interconnecting said links pivoted on said carriage.

6. The high density data storage tape drive of claim 1 wherein said coil of wire of said voice coil motor is disposed on and supported by said pivoted member while displaced from said end of said pivoted member supporting said read/write head.

7. A high density data storage tape drive for use with a removable cartridge having a pair of spools and containing a length of storage tape comprising:

a frame;

a drive connection engageable with said cartridge to spool tape from one of said spools to another of said spools;

a read/write head disposed adjacent to said storage tape;

said read/write head supported on a carriage, said read/write head displaceable relative to said carriage and said storage tape in finer increments;

said head supported by at least one pivoted member, said pivoted member supported on and pivoted on said carriage;

said pivoted member controlled by a voice coil motor, said voice coil motor comprised of at least a coil of wire and a magnet, said carriage supporting in a fixed position, one of said magnet and said coil of wire and said pivoted member supporting the other of said coil of wire and said magnet;

said pivoted member is pivotally movable about a living hinge pivot disposed central to said member and supported on said carriage;

whereby said carriage may be coarsely displaced to position said read/write head relative to said storage tape and said head may be further positioned in fine increments relative to said tape by said voice coil motor.

* * * * *